United States Patent
Nishida (10) Patent No.: US 9,962,797 B2
(45) Date of Patent: May 8, 2018

(54) REPAIR METHOD FOR CAST STEEL MEMBER

(71) Applicant: THE CHUGOKU ELECTRIC POWER CO., INC., Hiroshima (JP)

(72) Inventor: Hidetaka Nishida, Hiroshima (JP)

(73) Assignee: THE CHUGOKU ELECTRIC POWER CO., INC., Hiroshima (JP)

( * ) Notice: Subject to any disclaimer, the term of this patent is extended or adjusted under 35 U.S.C. 154(b) by 12 days.

(21) Appl. No.: 15/118,499

(22) PCT Filed: Feb. 13, 2014

(86) PCT No.: PCT/JP2014/053272
§ 371 (c)(1),
(2) Date: Aug. 12, 2016

(87) PCT Pub. No.: WO2015/121936
PCT Pub. Date: Aug. 20, 2015

(65) Prior Publication Data
US 2017/0182606 A1    Jun. 29, 2017

(51) Int. Cl.
*B23K 31/02* (2006.01)
*B23P 6/04* (2006.01)
(Continued)

(52) U.S. Cl.
CPC .............. *B23P 6/04* (2013.01); *B23K 9/007* (2013.01); *B23K 9/167* (2013.01); *B23P 6/045* (2013.01);
(Continued)

(58) Field of Classification Search
CPC . B23P 6/04; B23P 6/045; F01D 25/24; B23K 9/167; B23K 9/007;
(Continued)

(56) References Cited

U.S. PATENT DOCUMENTS

| 1,340,644 A | * | 5/1920 | Wilson | B23K 9/0026 |
| | | | | 219/137 R |
| 3,891,821 A | * | 6/1975 | Evertz | B22D 7/06 |
| | | | | 164/92.1 |

(Continued)

FOREIGN PATENT DOCUMENTS

| EP | 1844894 A1 | * | 10/2007 | ............. B23K 9/173 |
| GB | 1379113 A | * | 1/1975 | ............. B22D 7/066 |

(Continued)

OTHER PUBLICATIONS

Notification of Transmittal of Copies of Translation of the International Preliminary Report on Patentability for Application No. PCT/JP2014/053272 dated Aug. 25, 2016 (6 pages).

(Continued)

*Primary Examiner* — Kiley Stoner
(74) *Attorney, Agent, or Firm* — Osha Liang LLP (57) ABSTRACT

A repair method for repairing a crack generated to a cast steel member due to a thermal stress includes removing a part of the cast steel member including the crack at a surface of the cast steel member to form a recess, fitting into the recess a first repair member that is made of a metal that is more flexible than the cast steel member and that is weldable to the cast steel member, and spot welding the first repair member to the cast steel member.

4 Claims, 5 Drawing Sheets

(51) Int. Cl.
  *B23K 9/007* (2006.01)
  *B23K 9/167* (2006.01)
  *F01D 25/24* (2006.01)
  *B23K 103/06* (2006.01)
  *B23K 101/00* (2006.01)

(52) U.S. Cl.
  CPC ........ *F01D 25/24* (2013.01); *B23K 2201/001* (2013.01); *B23K 2203/06* (2013.01); *F05D 2220/31* (2013.01); *F05D 2230/80* (2013.01); *F05D 2300/171* (2013.01)

(58) Field of Classification Search
  CPC ......... B23K 2201/001; F05D 2300/171; F05D 2230/80; F05D 2220/31
  USPC ...... 228/119, 262.4–262.41, 262.3; 29/889.1
  See application file for complete search history.

(56) References Cited

U.S. PATENT DOCUMENTS

| | | | | |
|---|---|---|---|---|
| 4,068,111 A | * | 1/1978 | Klumpes | B23K 25/005 219/137 R |
| 4,599,781 A | * | 7/1986 | Diperstein | B23P 6/04 164/92.1 |
| 4,662,806 A | * | 5/1987 | Reed | B23P 6/04 206/231 |
| 4,832,252 A | * | 5/1989 | Fraser | B23P 6/005 228/119 |
| 4,845,828 A | * | 7/1989 | Reed | B23P 6/04 29/402.15 |
| 5,033,938 A | * | 7/1991 | Fraser | B23P 6/005 228/119 |
| 5,062,205 A | * | 11/1991 | Fraser | B23P 15/04 228/119 |
| 5,085,363 A | * | 2/1992 | Sims | B23K 9/046 219/76.14 |
| 5,494,539 A | * | 2/1996 | Tsujimura | B23P 6/04 148/522 |
| 5,606,796 A | * | 3/1997 | Fraser | B23K 9/04 228/119 |
| 5,607,603 A | * | 3/1997 | Sappok | B23K 9/04 219/124.03 |
| 5,674,419 A | * | 10/1997 | Koide | B23K 31/02 148/524 |
| 6,238,187 B1 | | 5/2001 | Dulaney et al. | |
| 6,413,041 B1 | | 7/2002 | Sedillo | |
| 2001/0025417 A1 | | 10/2001 | Fried et al. | |
| 2009/0229101 A1 | | 9/2009 | Ahmad et al. | |
| 2009/0250447 A1 | * | 10/2009 | Guth | B23K 33/004 219/137 R |
| 2010/0062151 A1 | * | 3/2010 | Tuppen | B23P 6/002 427/140 |

FOREIGN PATENT DOCUMENTS

| | | | | |
|---|---|---|---|---|
| JP | 2011-214541 A | | 10/2011 | |
| SU | 1303352 A1 | * | 4/1987 | ............... B23P 6/04 |
| WO | WO 2013086721 A1 | * | 6/2013 | ............ B22D 19/10 |

OTHER PUBLICATIONS

Office Action in corresponding Japanese Patent Application No. 2015-512422 dated Jul. 14, 2015, with translation (5 pages.).
Office Action in corresponding Japanese Patent Application No. 2015-512422 dated Dec. 8, 2015, with translation (5 pages).
Office Action in corresponding Japanese Patent Application No. 2015-512422 dated May 17, 2016, with translation (5 pages).
International Search Report issued in corresponding application No. PCT/JP2014/053272 dated May 13, 2014 (2 pages).
Office Action in counterpart Canadian Patent Application No. 2,939,466 dated Oct. 18, 2017 (3 pages).
Office Action in counterpart Chinese Patent Application No. 201480075520.7 dated Nov. 14, 2017 (11 pages).

* cited by examiner

REPAIR METHOD FOR CAST STEEL MEMBER

TECHNICAL FIELD

The present invention relates to a repair method for repairing a crack that was generated to a cast steel member due to thermal stress.

BACKGROUND ART

Cast steel members used in thermal power equipment, nuclear power equipment or the like are kept at high temperature and high pressure conditions for a long time in many cases, and therefore such equipment suffers creep damage due to thermal stress which in turn has generates cracks as a cause thereof.

Repair of such cracks are commonly carried out by a method including scraping parts adjacent the crack surface, hardfacing thereon and performing heat treatment. PTL 1, for example, discloses a case of repairing a turbine blade surface by forming a cutting surface to the surface crack, heating the surroundings of this cutting surface, welding and hardfacing the heated cutting surface with a welding material such as nickel base alloy, cutting the built up part after cooling and performing heat treatment to precipitate a gamma prime (γ') phase.

CITATION LIST

Patent Literature

[PTL 1] Japanese Laid-open Application No. 2011-214541

However, many of the cast steel members used in thermal power equipment, nuclear power equipment or the like, such as a steam turbine room and a steam turbine blade, are formed so large that these members cannot be transported back to the plant for heat treatment. Therefore, the heat treatment has to be performed on site where the scale of the heat treatment which was performed was limited, and this has lead to insufficient heat treatment as a result and had rather caused a defective condition such as embrittlement of the repaired part making such liable to fracture.

SUMMARY OF THE INVENTION

One or more embodiments of the present invention provide a repair method for certainly repairing on site, cracks that were generated on a surface of a cast steel member due to thermal stress.

One or more embodiments provide a repair method for repairing a crack generated to a cast steel member due to a thermal stress, including removing a part including the crack at a surface of the cast steel member and forming a recess, fitting into the recess a first repair member that is made of a metal that is more flexible with respect to the cast steel member and that is weldable to the cast steel member, and joining by spot welding to the cast steel member the first repair member that was fit in.

According to one or more embodiments of the present invention, fitting into the part that had the crack removed a first repair member made of a metal that is more flexible with respect to the cast steel and that is weldable to the cast steel as well, allows thermal stress on this first repair member itself (the recess having the crack removed) to be released to the surroundings. And hereby, cracks can be prevented from generating from the repaired part. Further, according to one or more embodiments of the present invention, welding the first repair member to the cast steel is performed by spot welding which allows easy work on site. Hereby, the crack generated on the cast steel surface due to thermal stress can be certainly repaired on site.

According to one or more embodiments, a strip-form second repair member that is made of a metal that is more flexible with respect to the cast steel member and that is weldable to the cast steel member is welded in a manner intersecting a lengthwise direction of the crack and spanning over the first repair member that was fit in.

The direction that intersects the lengthwise direction of the crack is the direction in which thermal stress is likely to apply. Therefore, welding using the second repair member that is more flexible with respect to the cast steel, in a manner such that the second repair member crosses over the first repair member to intersect the lengthwise direction of the crack, as in one or more embodiments of the present invention, can certainly prevent a crack from generating from the repaired part.

According to one or more embodiments, the mounted second repair member and a main body of the cast steel member are joined by spot welding.

According to one or more embodiments of the present invention, on site work can be easily carried out since spot welding is also performed when welding the second repair member.

According to one or more embodiments, the first repair member and the second repair member are made of a same material.

According to one or more embodiments, cracks can be efficiently suppressed from generating from the repaired part by using the same material for the first and the second repair members to allow the thermal stress on the repaired part to evenly disperse to the surroundings thereof.

According to one or more embodiments, metal members made of, for example, 99.9% purity nickel is used for the first and the second repair members in the above case.

Advantageous Effects of Invention

According to one or more embodiments of the present invention, cracks that were generated on a surface of a cast steel member due to thermal stress can be certainly repaired on site.

DESCRIPTION OF EMBODIMENTS

Figure 1:
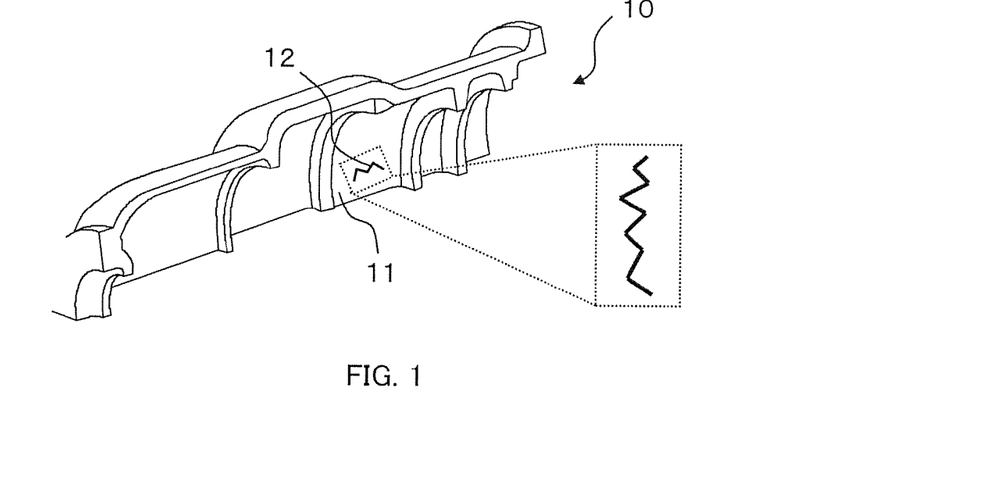
FIG. 1 is an explanatory view of an example of a shell member of a steam turbine wheel chamber according to one or more embodiments of the invention.

The repair method for a cast steel member according to one or more embodiments can be applied to repair cracks generated to a cast steel member due to thermal stress and, for example, can be applied to the shell member 10 of a steam turbine wheel chamber provided to a thermal power equipment, nuclear power equipment or the like, shown in FIG. 1.

The shell member 10 of a steam turbine wheel chamber is made of a cast steel member such as CrMoV cast steel and is subject to thermal stress that is accompanied by the start-stop operation thereof. Hereby, the shell member 10 of a steam turbine wheel chamber will suffer creep damage so that a crack 12 will be generated to the inner surface 11. The crack 12 will appear in, for example, a zigzag form as illustrated in FIG. 1. The following describes a method for repairing a cast steel member according to one or more embodiments taking the repair method for this crack 12 as an example.

Figure 2:
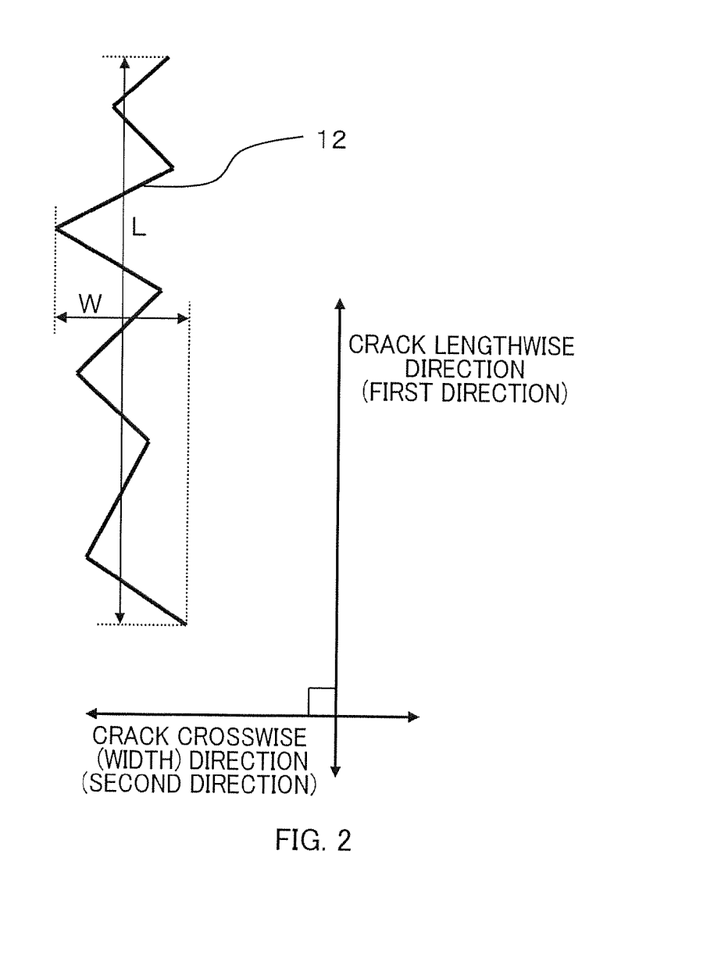
FIG. 2 is an enlarged view of a crack 12 according to one or more embodiments of the invention.

FIG. 2 is an enlarged view of the crack 12. The repair method according to one or more embodiments firstly determines for the crack 12 that was generated to the surface 11, the lengthwise direction (first direction) of the crack 12 and the crosswise direction (second direction) of the crack 12 being the direction orthogonal to the lengthwise direction, as shown in FIG. 2. Thereafter, the length of the crack 12 in the lengthwise direction and the length of the crack 12 in the crosswise direction are measured with a caliper or the like.

The length in the lengthwise direction of the crack 12 which needs to be repaired is, for example, 5 mm to 100 mm and the length in the crosswise direction of the crack 12 is, for example, 0.1 mm to 10 mm. The length along the lengthwise direction of the crack 12 is set to L and the length along the crosswise direction of the crack 12 is set to W in one or more embodiments, as shown in FIG. 2.

Figure 3:
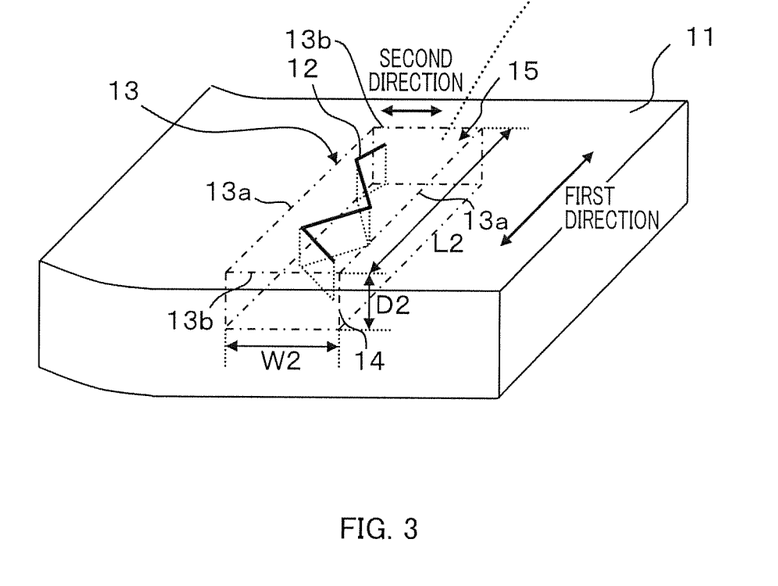
FIG. 3 is a view illustrating the removal of the crack part with reference to a cut line 13 according to one or more embodiments of the invention.

Subsequently, this crack 12 is removed. For the sake of description, the rectangular cut line 13 that surrounds the entire crack 12 is assumed to be set to the parent material surface, as shown in FIG. 3. The direction along the long side 13a of the cut line 13 is set parallel to the previously set lengthwise direction of the crack 12 and the direction along the short side 13b of the cut line 13 is set parallel to the previously set crosswise direction of the crack 12.

The length of the long side 13a of the cut line 13 is, for example, approximately 1 mm to 120 mm. And the length of the short side 13b of the cut line 13 is, for example, approximately 1 mm to 30 mm. The long side 13a of the cut line 13 is set to L2 and the short side 13b of the cut line 13 is set to W2 in one or more embodiments, as shown in FIG. 3.

Then the crack 12 and the surroundings thereof are removed with reference to this cut line 13. In other words, the surface 11 is cut along the cut line 13 halfway in the depth direction to be removed, as illustrated in FIG. 3. This work is carried out using a tool such as, for example, a drill, an end mill or the like.

The depth of the surface 11 that is cut for removal requires to be deeper than the depth of the crack 12 that is recognized to have developed. Cutting should be repeated little by little while confirming the existence of the crack when the amount of crack 12 developed toward the inside is unknown.

The depth of the cutting for removal is specifically, approximately 1 mm to 100 mm, for example. The recess 15 is formed to be in an approximately rectangular parallelepiped space with the side 14 in the depth direction having a length of D2 in one or more embodiments, as shown in FIG. 3.

Figure 4:
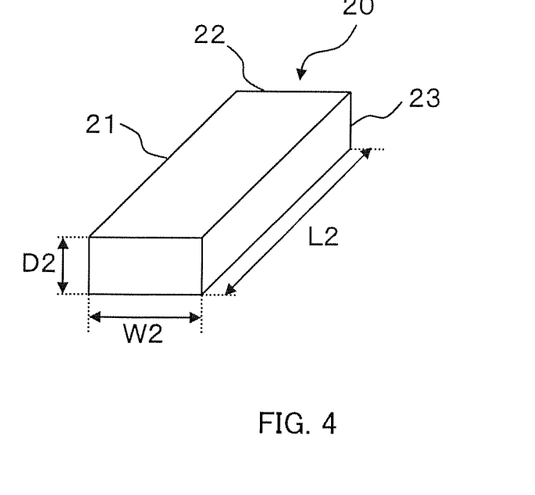
FIG. 4 is an explanatory view illustrating a configuration of the first repair member 20 according to one or more embodiments of the invention.

Next, the recess 15 formed in the above manner is repaired with the repair member (hereinafter called, first repair member 20) shown in FIG. 4. The first repair member 20 is formed in a shape same as that of the recess 15. For the sake of description, the first repair member 20 is a rectangular parallelepiped member with the sides 21 having a length of L2, sides 22 having a length of W2 and sides 23 having a length of D2.

Figure 5:
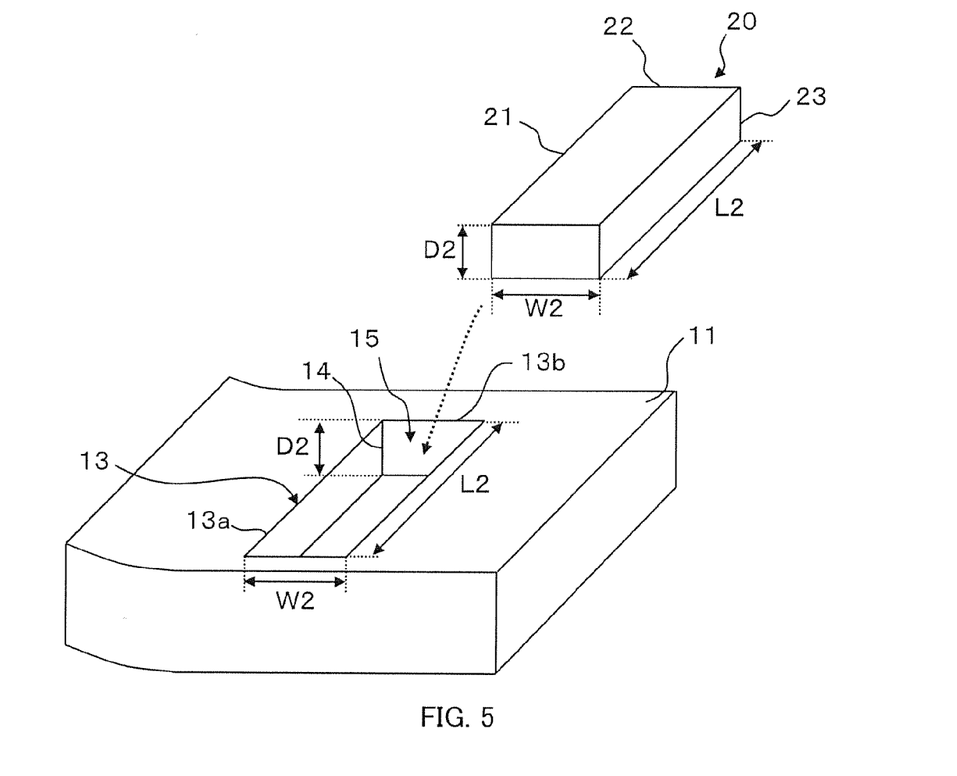
FIG. 5 is an explanatory view illustrating a manner in which the first repair member 20 is mounted to the recess 15 according to one or more embodiments of the invention.

Thereafter, this first repair member 20 is embedded into the recess 15, as shown in FIG. 5. Specifically, the sides 21 of the first repair member 20 are made to correspond to the long sides 13a of the cut line 13, the sides 22 of the first repair member 20 are made to correspond to the short sides 13b of the cut line 13 and the sides 23 of the first repair member 20 are made to correspond to the sides 14 along the depth direction of the recess 15 to fit the first repair member 20 into the recess 15. And then the first repair member 20 is pushed into the recess 15 by tapping the surface side thereof.

Here, the material of the first repair member 20 is made of a metal material that is more flexible with respect to the material (cast steel) of the surface 11. The reason for this is as follows. Although the surface 11 where the crack 12 was generated is a part to which thermal stress is likely to occur, it is unlikely that a crack would generate from the repaired part, because fitting therein the first repair member 20 that is more flexible with respect to the cast steel which is the material of the surface 11 allows the thermal stress on the first repair member 20 to be dispersed to the surroundings thereof.

Pure nickel can be given as an example of this material for such first repair member 20. In one or more embodiments, the purity of the nickel is 99.9% and greater. Further, for example, chrome, steel, aluminum and the like are suitable for metals besides nickel and the purity thereof in these cases is 99.9999% and greater.

Figure 6:
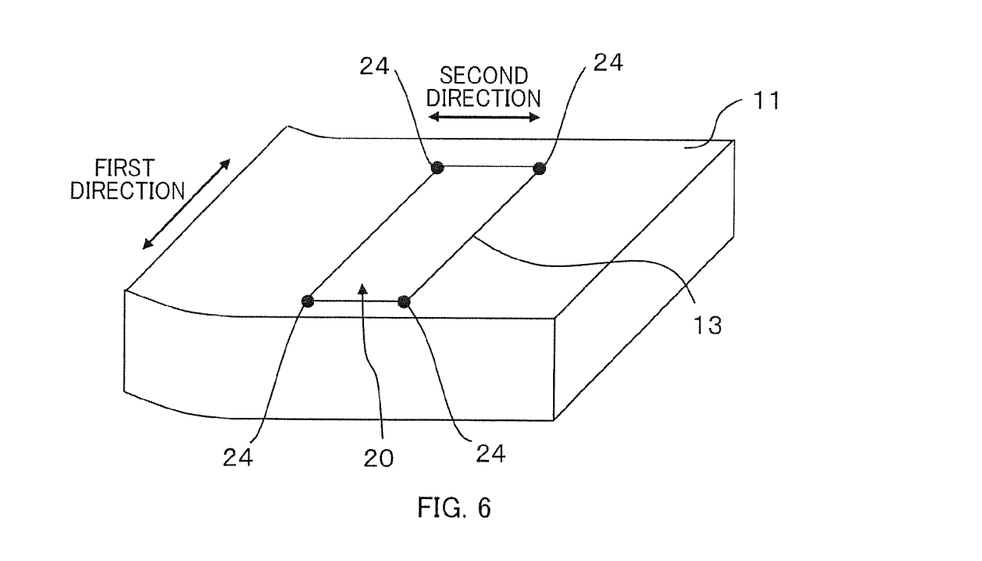
FIG. 6 is an explanatory view illustrating spot welding carried out for fixing the first repair member 20 to the surface 11 of the parent material.

Subsequently, spot welding is performed to the first repair member 20 as indicated with the reference numbers 24 in FIG. 6. In other words, the corners of the first repair member 20 are joined to the parent material at the surface 11 by spot welding. Spot welding is performed to the four corners in the example of FIG. 6. This spot welding can be performed by, for example, Tungsten Inert Gas (TIG) welding.

The first repair member 20 requires to be a metal material to which such spot welding can be performed. And the aforementioned pure nickel and the like satisfy this condition.

Figure 7:
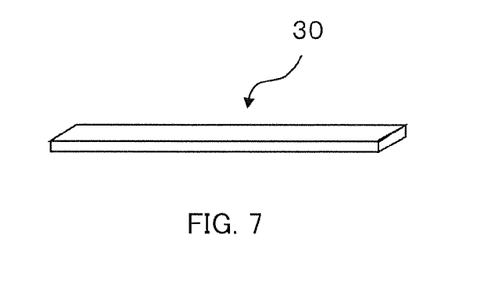
FIG. 7 is an explanatory view illustrating a configuration of the second repair member 30 according to one or more embodiments of the invention.

Then the part that was repaired using the first repair member 20 is further reinforced. FIG. 7 illustrates the member (hereinafter, second repair member 30) used for this reinforcement. As shown in FIG. 7, the second repair member 30 is a member in a strip form.

Figure 8:
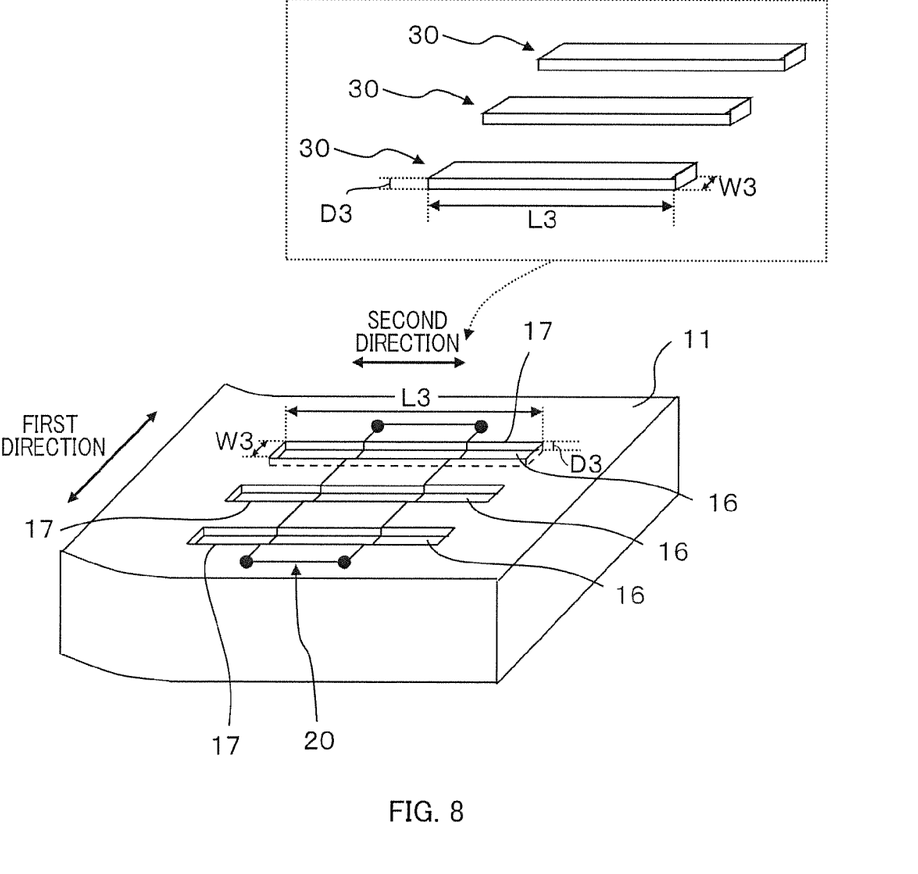
FIG. 8 is an explanatory view illustrating a manner in which the second repair member 30 is mounted to the groove 16 according to one or more embodiments of the invention.

The second repair member 30 is mounted on the surface 11 of the parent material. FIG. 8 is an explanatory view illustrating the manner in which the second repair member 30 is mounted to the parent material. As shown in FIG. 8, grooves 16 are formed to the surface 11 of the parent material when mounting the second repair members 30.

A groove 16 is formed by cutting the surface 11 along the rectangular cut line 17 that is provided to the surface of the parent material. The groove 16 is formed such that the second repair member 30 fits therein when the second repair member 30 is mounted into the groove 16. The groove 16 is formed using a tool such as, for example, a cutter, an end mill or the like. The groove 16 may be formed by removing the surface 11 by other machine work such as grinding.

As illustrated in FIG. 8, the groove 16 is provided to span over the first repair member 20 where the lengthwise direction of the groove 16 is set in a direction that intersects the lengthwise direction (first direction) of the first repair member 20. The lengthwise direction of the groove 16 comes along the direction (parallel to the crosswise direction of the crack 12) that forms an approximate right angle (80 to 90 degrees) between the lengthwise direction. The angle formed between the lengthwise direction of the groove 16 and the lengthwise direction is an approximate right angle in one or more embodiments.

The depth of the groove 16 matches the thickness of the second repair member 30 and is designed such that the second repair member 30 is mount flush with the parent material surface that is associated with the repair part when the second repair member 30 is mounted. The depth of the groove 16 and the thickness of the second repair member 30 match each other in one or more embodiments.

The lengthwise length of the groove 16 is, for example, 5 mm to 100 mm, the crosswise (in a direction parallel to the lengthwise direction of the first repair member 20) length of the groove 16 is, for example, 1 mm to 20 mm, and the length along the depth direction of the groove 16 is, for example 1 mm to 20 mm. The present example assumes that the length along the lengthwise direction of the groove 16 is L3, the length along the crosswise direction of the groove 16 is W3 and that along the depth direction (material thickness direction) of the groove 16 is D3, as shown in FIG. 8. Therefore, the length along the lengthwise direction of the second repair member 30 is L3, the length along the width direction of the second repair member 30 is W3 and the length along the thickness direction of the second repair member 30 is D3.

Similar to the first repair member 20, the material of the second repair member 30 is a metal material that can have performed spot welding thereto. Additionally, same as the first repair member 20, the material of the second repair member 30 is a metal material that is more flexible with respect to the surface 11. The material of the first repair member 20 being the same as that of the second repair member 30 allows thermal stress on the repair part to be evenly dispersed to the surroundings thereof so that crack generation from the repair part can be effectively suppressed.

The aforementioned pure nickel can be given as an example of this material for such second repair member 30. In one or more embodiments the purity of the nickel is at least 99.9% and greater. Further, for example, chrome, steel, aluminum and the like are metals besides nickel that can be used and the purity thereof in these cases is 99.9999% and greater.

Lastly, the second repair member 30 that is fit into the groove 16 and the parent material are fixed by spot welding. That is, the four corners of the second repair member 30 and the four corners of the cut line 17 are respectively fixed by spot welding, as indicated with the reference numbers 31 in FIG. 9. This spot welding is performed by, for example, Tungsten Inert Gas (TIG) welding.

Figure 9:
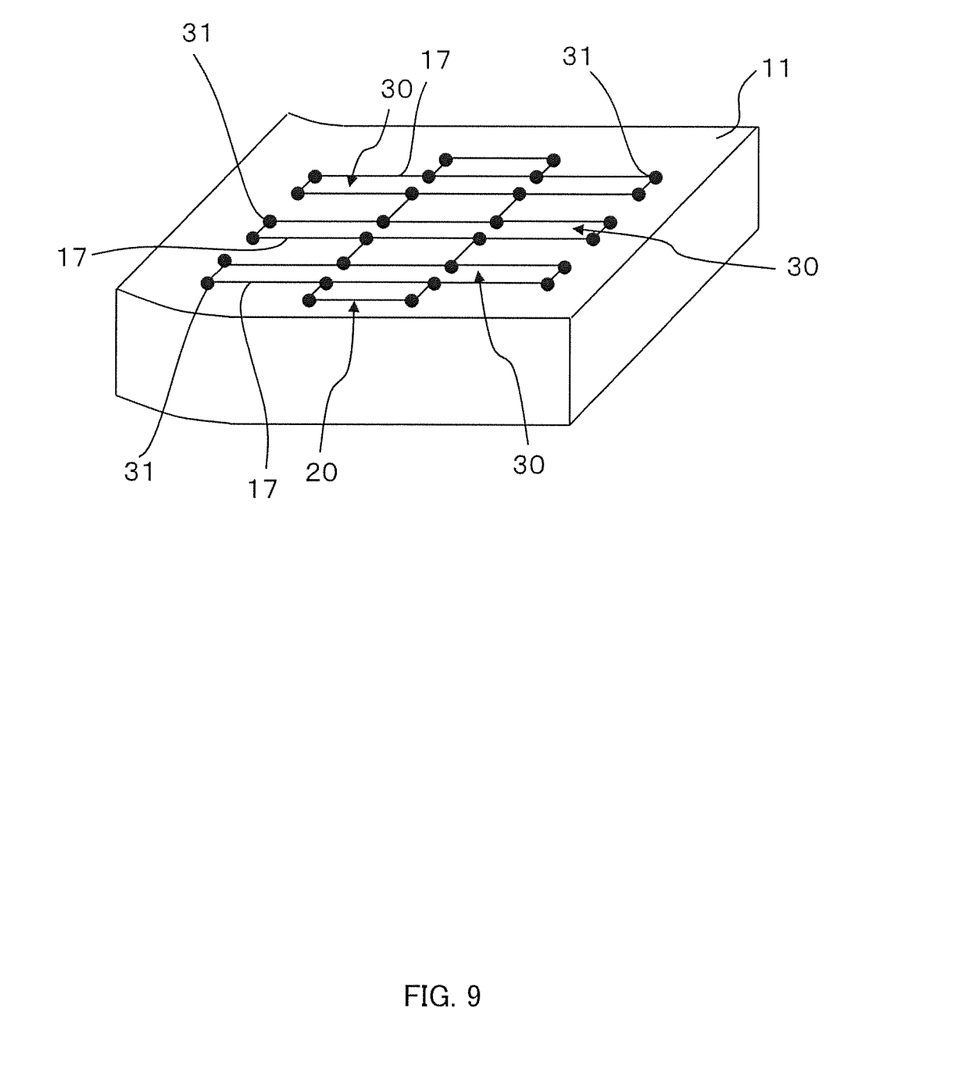
FIG. 9 is an explanatory view illustrating spot welding carried out for fixing the second repair member 30 to the parent material according to one or more embodiments of the invention.

Hereby, mounting of the second repair member 30 in the direction intersecting the lengthwise direction of the first repair member 20, that is, the direction intersecting the lengthwise direction of the crack 12 effectively prevents a crack from generating from the repair part. That is, because the direction that intersects the direction (lengthwise direction of the crack 12) in which the crack 12 was generated is the direction in which thermal stress is likely to occur, cracks can be effectively prevented from generating by making the material of the second repair member 30 more flexible with respect to the cast steel member, similar to the case of the first repair member 20.

And in this case, on site work can be easily carried out since spot welding is performed for welding the second repair member 30 to the parent material, similar to the case of the first repair member 20.

As described above, in the repair method according to one or more embodiments, fitting into the recess 15 the first repair member 20 made of a metal that is more flexible with respect to the cast steel member being the member to be repaired as well as a metal that is weldable to the cast steel member allows this first repair member 20 to release to the surroundings the thermal stress applied to this repair part and therefore cracks can be prevented from generating from the repaired part. Hereby, cracks that were generated to the surface of the cast steel member due to thermal stress can be certainly repaired.

In particular, the cracks that were generated due to thermal stress are likely to appear on the surface of a member. And therefore, forming the first repair member 20 in a shape that fits into the recess 15 and allowing the first repair member 20 embedded in the recess 15 to contact the surface of the recess 15 can effectively prevent cracks from generating from the surface of the recess 15.

Further, in the repair method according to one or more embodiments, welding the first repair member 20 and the second repair member 30 to the parent material is performed by spot welding which allows easy site work. Hereby, cracks can be certainly repaired on site even when the cracks were generated to large size cast steel members such as those equipped to thermal power plants, nuclear power plants or the like.

The aforementioned description of the embodiments is simply for facilitating the understanding of the present invention and is not in any way to be construed as limiting the present invention. The present invention may variously be changed or altered without departing from its spirit and encompasses equivalents thereof.

For example, FIGS. 8 and 9 have been illustrated to provide a plurality of the second repair members 30, however, only one second repair member 30 may be provided when the crack 12 is short.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

REFERENCE SIGNS LIST 10 turbine wheel chamber shell member, 11 surface, 12 crack, 13 cut line, 13a long side, 13b short side, 14 side in depth direction, 15 recess, 16 groove, 17 cut line, 20 first repair member, 21 side, 22 side, 23 side, 30 second repair member

The invention claimed is:

1. A repair method for repairing a crack generated to a cast steel member due to a thermal stress, comprising:
   removing a part of the cast steel member including the crack at a surface of the cast steel member and forming a recess;
   fitting into the recess a first repair member that is made of a metal that is more flexible than the cast steel member and that is weldable to the cast steel member;
   spot welding the first repair member to the cast steel member; and
   welding a strip-form second repair member, made of a metal that is more flexible than the cast steel member and that is weldable to the cast steel member, to the cast steel member in a manner intersecting a lengthwise direction of the crack and spanning over the first repair member.

2. The method of repairing a cast steel member according to claim 1, further comprising:
   spot welding the mounted second repair member and a main body of the cast steel member.

3. The method of repairing a cast steel member according to claim 1, wherein the first repair member and the second repair member are made of a same material.

4. The method of repairing a cast steel member according to claim 3, wherein the first repair member and the second repair member are metal members made of nickel that has a purity of 99.9% or greater.

* * * * *